US008654253B2

(12) United States Patent
Huang et al.

(10) Patent No.: US 8,654,253 B2
(45) Date of Patent: Feb. 18, 2014

(54) VIDEO APPARATUS CAPABLE OF OUTPUTTING OSD DATA THROUGH UNAUTHORIZED OUTPUT PATH TO PROVIDE USER WITH WARNING MESSAGE OR INTERACTIVE HELP DIALOGUE

(75) Inventors: Hsiang-Sung Huang, Hsinchu County (TW); Ting-Hsun Wei, Tainan Hsien (TW); Hua Wu, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1548 days.

(21) Appl. No.: 11/834,027

(22) Filed: Aug. 6, 2007

(65) Prior Publication Data

US 2009/0040384 A1    Feb. 12, 2009

(51) Int. Cl.
| | |
|---|---|
| H04N 5/50 | (2006.01) |
| H04N 5/45 | (2011.01) |
| H04N 5/46 | (2006.01) |
| H04N 5/262 | (2006.01) |
| H04N 5/445 | (2011.01) |
| H04N 9/74 | (2006.01) |
| H04N 9/76 | (2006.01) |
| H04N 11/20 | (2006.01) |
| H04L 29/06 | (2006.01) |
| G11B 5/58 | (2006.01) |

(52) U.S. Cl.
USPC ........... 348/569; 348/239; 348/441; 348/555; 348/557; 348/564; 348/565; 348/566; 348/589; 348/600; 369/53.24; 369/94; 713/165

(58) Field of Classification Search
USPC ......... 348/569, 239, 555, 557, 566, 589, 600, 348/636, E5.047, E5.099, E5.1, E5.101, 348/E5.108, E5.111, E5.112, E5.114, 441, 348/564, 565, E5.002; 369/53.24, 94; 713/165; 386/E5.07
See application file for complete search history.

(56) References Cited

U.S. PATENT DOCUMENTS

| | | | | |
|---|---|---|---|---|
| 6,226,047 | B1 * | 5/2001 | Ryu | 348/569 |
| 6,421,094 | B1 * | 7/2002 | Han | 348/569 |
| 7,375,761 | B2 * | 5/2008 | Oku et al. | 348/441 |
| 7,710,843 | B2 * | 5/2010 | Lee | 369/53.24 |
| 2006/0221210 | A1 * | 10/2006 | Miura | 348/239 |
| 2007/0030782 | A1 | 2/2007 | Lee | |
| 2008/0022095 | A1 * | 1/2008 | Kamio et al. | 713/165 |

FOREIGN PATENT DOCUMENTS

| | | | |
|---|---|---|---|
| CN | 1489386 A | | 4/2004 |
| CN | 1836441 A | | 9/2006 |
| KR | 2004015611 A | * | 2/2004 |
| KR | 2005027351 A | * | 3/2005 |
| WO | 0075779 A2 | | 12/2000 |

* cited by examiner

Primary Examiner — Thai Tran
Assistant Examiner — Syed Hasan
(74) Attorney, Agent, or Firm — Winston Hsu; Scott Margo

(57) ABSTRACT

A video apparatus includes a video processor for performing video processing to generate normal video data. The video processor includes an on-screen display (OSD) module for selectively generating OSD data that is capable of being mixed into the normal video data. The video apparatus further includes a digital output path including a digital transmitter and an analog output path including a digital-to-analog converter (DAC). The video apparatus is capable of outputting OSD data through an unauthorized output path out of the digital and analog output paths to provide a user with a warning message or an interactive help dialogue.

13 Claims, 3 Drawing Sheets

VIDEO APPARATUS CAPABLE OF OUTPUTTING OSD DATA THROUGH UNAUTHORIZED OUTPUT PATH TO PROVIDE USER WITH WARNING MESSAGE OR INTERACTIVE HELP DIALOGUE

BACKGROUND

The present invention relates to on-screen display (OSD), and more particularly, to video apparatus capable of outputting OSD data through an unauthorized output path to provide a user with a warning message or an interactive help dialogue.

According to the related art, when a High-bandwidth Digital Content Protection (HDCP) authentication fail is detected at a digital output such as a High-Definition Multimedia Interface (HDMI) output, a conventional video apparatus typically sends nothing or bypasses erroneously decoded results, so that a display device coupled to the HDMI output displays a black screen or 'snow'. As a result, the user is unaware of the particular problem. According to the related art, a flashing LED may be applied to the video apparatus to notify the user of the HDCP authentication fail; however, this could easily be ignored by the user since the flashing LED is not obvious and the meaning is not explicit.

SUMMARY

It is an objective of the claimed invention to provide video apparatus capable of outputting on-screen display (OSD) data through an output path that is intended to be temporarily not utilized by a user for a normal display purpose.

It is another objective of the claimed invention to provide video apparatus capable of outputting OSD data through an unauthorized output path to provide a warning message or an interactive help dialogue, where the unauthorized output path represents an output path that is intended to be temporarily not utilized by a user for a normal display purpose.

It is another objective of the claimed invention to provide video apparatus capable of outputting OSD data through an unauthorized output path to provide a user with a warning message or an interactive help dialogue, where the OSD data can be generated by utilizing a normal OSD module or an auxiliary OSD module.

An exemplary embodiment of a video apparatus comprises a video processor for performing video processing to generate normal video data. The video processor comprises a first OSD module for selectively generating first OSD data that is capable of being mixed into the normal video data. The video apparatus further comprises: an OSD data input node for inputting second OSD data generated by the video apparatus; a digital output path; and an analog output path. The digital output path comprises: a digital transmitter, coupled to the video processor or the OSD data input node, for outputting the normal video data or the second OSD data. The analog output path comprises: a digital-to-analog converter (DAC), coupled to the video processor or the OSD data input node, for outputting the normal video data or the second OSD data in an analog format. When one output path of the digital and analog output paths outputs the second OSD data, the other output path of the digital and analog output paths outputs the normal video data.

An exemplary embodiment of a video apparatus comprises a video processor for performing video processing to generate normal video data. The video processor comprises a first OSD module for selectively generating first OSD data that is capable of being mixed into the normal video data. The video apparatus further comprises: an OSD data input node for inputting second OSD data generated by the video apparatus; a digital output path comprising a digital transmitter capable of outputting the normal video data or the second OSD data, wherein the digital transmitter outputs the second OSD data when coupled to the OSD data input node; and an analog output path comprising a DAC capable of outputting the normal video data or the second OSD data in an analog format, wherein the DAC outputs the second OSD data when coupled to the OSD data input node.

An exemplary embodiment of a video apparatus comprises a video processor for performing video processing to generate normal video data. The video processor comprises an OSD module for selectively generating OSD data that is capable of being mixed into the normal video data. The video apparatus further comprises a digital output path and an analog output path. The digital output path comprises a digital transmitter, coupled to the video processor, for outputting the normal video data. The analog output path comprises a DAC, coupled to the video processor, for outputting the normal video data in an analog format. When a coupling status of an output node of the DAC is detected, the video processor is capable of mixing the OSD data into the normal video data. These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
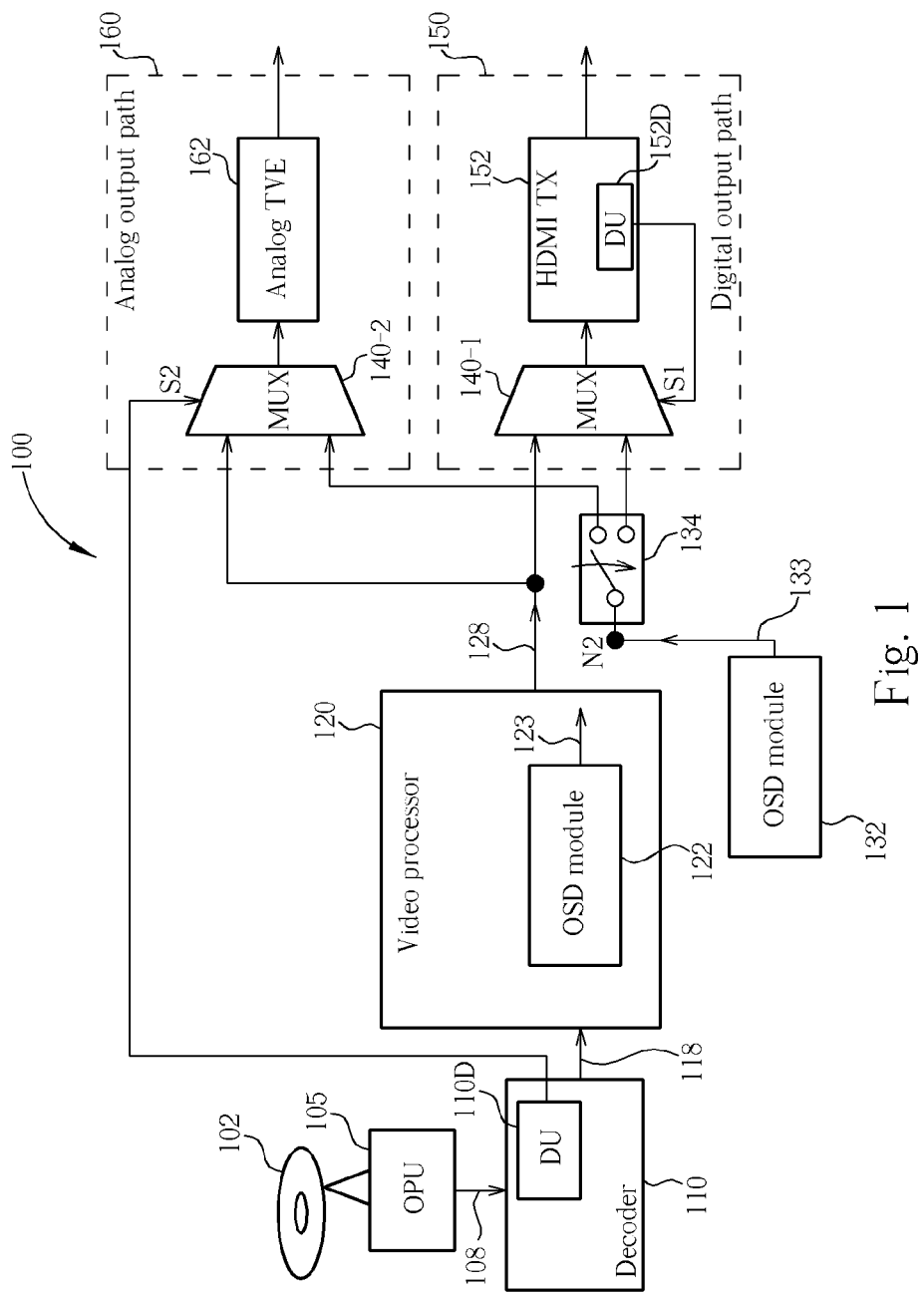
FIG. 1 is a diagram of a video apparatus according to one embodiment of the present invention.

Please refer to FIG. 1. FIG. 1 is a diagram of a video apparatus 100 according to a first embodiment of the present invention, where the video apparatus 100 of this embodiment is an optical disc player accessing an optical disc 102. The video apparatus 100 comprises an optical pickup (OPU) 105, a decoder 110, a video processor 120, a digital output path 150, and an analog output path 160, where the digital output path 150 comprises a multiplexer 140-1 and a digital transmitter such as a High-Definition Multimedia Interface transmitter (HDMI TX) 152, and the analog output path 160 comprises a multiplexer 140-2 and an analog TV encoder (TVE) 162. Please note that the analog TVE 162 of this embodiment comprises a digital-to-analog converter (DAC) as an output stage of the analog output path 160.

According to this embodiment, the decoder 110 is utilized for decoding encoded data 108 to generate decoded data 118, where the encoded data 108 is read from the optical disc 102 by utilizing the OPU 105 in this embodiment. In addition, the video processor 120 performs video processing on the decoded data 118 to generate the normal video data 128. As shown in FIG. 1, the video processor 120 comprises an on-screen display (OSD) module 122 for selectively generating OSD data 123 that is capable of being mixed into the normal video data 128. That is, the normal video data 128 typically represents program or movie contents stored in the optical disc 102, and on some occasions, the OSD data 123 can be mixed into the normal video data 128 to overlap or replace a portion of the program or movie contents to be displayed.

As shown in FIG. 1, the video apparatus 100 of this embodiment further comprises an OSD data input node N2 for inputting OSD data 133 generated by the video apparatus 100. In this embodiment, the video apparatus 100 comprises an OSD module 132 for generating the OSD data 133, and further comprises a switch 134 for outputting the OSD data 133 to the multiplexer 140-1 or the multiplexer 140-2 according to control by the video apparatus 100, and more particularly, according to the control of at least one determining unit of the video apparatus 100.

In this embodiment, the multiplexer 140-1 is utilized for coupling the HDMI TX 152 to the video processor 120 or the OSD data input node N2 to select the normal video data 128 or the OSD data 133 according to a selection signal S1, and the multiplexer 140-2 is utilized for coupling the analog TVE 162 to the video processor 120 or the OSD data input node N2 to select the normal video data 128 or the OSD data 133 according to a selection signal S2. In addition, the digital transmitter of this embodiment, i.e. the HDMI TX 152, comprises a determining unit (DU) 152D for controlling the selection of the multiplexer 140-1 by utilizing the selection signal S1, and the decoder 110 comprises a DU 110D for controlling the selection of the multiplexer 140-2 by utilizing the selection signal S2. As a result, if the multiplexer 140-1 selects the normal video data 128 (i.e. the multiplexer 140-1 couples the HDMI TX 152 to the video processor 120), the HDMI TX 152 outputs the normal video data 128; otherwise (i.e. the multiplexer 140-1 couples the HDMI TX 152 to the OSD data input node N2), the HDMI TX 152 outputs the OSD data 133. Similarly, if the multiplexer 140-2 selects the normal video data 128 (i.e. the multiplexer 140-2 couples the analog TVE 162 to the video processor 120), the analog TVE 162 outputs the normal video data 128; otherwise (i.e. the multiplexer 140-2 couples the analog TVE 162 to the OSD data input node N2), the analog TVE 162 outputs the OSD data 133.

According to this embodiment, when one output path of the digital output path 150 and the analog output path 160 outputs the OSD data 133, the other output path of the digital output path 150 and the analog output path 160 outputs the normal video data 128, where the OSD data 133 may represent a warning message, and the normal video data 128 outputted by the other path may represent a normal video output such as the program or movie contents mentioned above. On one hand, the DU 152D is capable of detecting whether a High-bandwidth Digital Content Protection (HDCP) authentication fail occurs. If the DU 152D determines that an HDCP authentication fail occurs, the DU 152D outputs the selection signal S1 correspondingly, so the digital output path 150 may output a warning message such as "HDCP authentication fail". As a result, the user will be clearly and directly notified through the warning message display on a display device coupled to the digital output path 150, instead of being confused by a black screen or snow as mentioned above. On the other hand, the DU 110D is capable of detecting whether the decoded data 118 corresponds to Digital Only Token (DOT), which is defined in Advanced Access Content System (AACS) specifications for blue ray systems such as HD-DVD or Blu-ray Disc (BD) systems. If the DU 110D determines that the decoded data 118 corresponds to DOT, the analog output path 160 may output a warning message such as "Digital Only Token". As a result, the user will be clearly notified through the warning message display on a display device coupled to the analog output path 160.

According to a variation of this embodiment, the OSD data 133 may represent a warning message and/or an interactive help dialogue. More particularly, in this variation, the OSD module 132 not only generates the OSD data corresponding to the warning message(s), but also provides OSD data corresponding to some interaction effects. The user can press a certain IR key to derive more information such as help information. According to this variation, the OSD module 132 may also generate OSD data corresponding to IR key and menu operations, and the IR key and menu operations are still available to the user even when an HDCP authentication fail occurs or the decoded data 118 corresponds to DOT.

Figure 2:
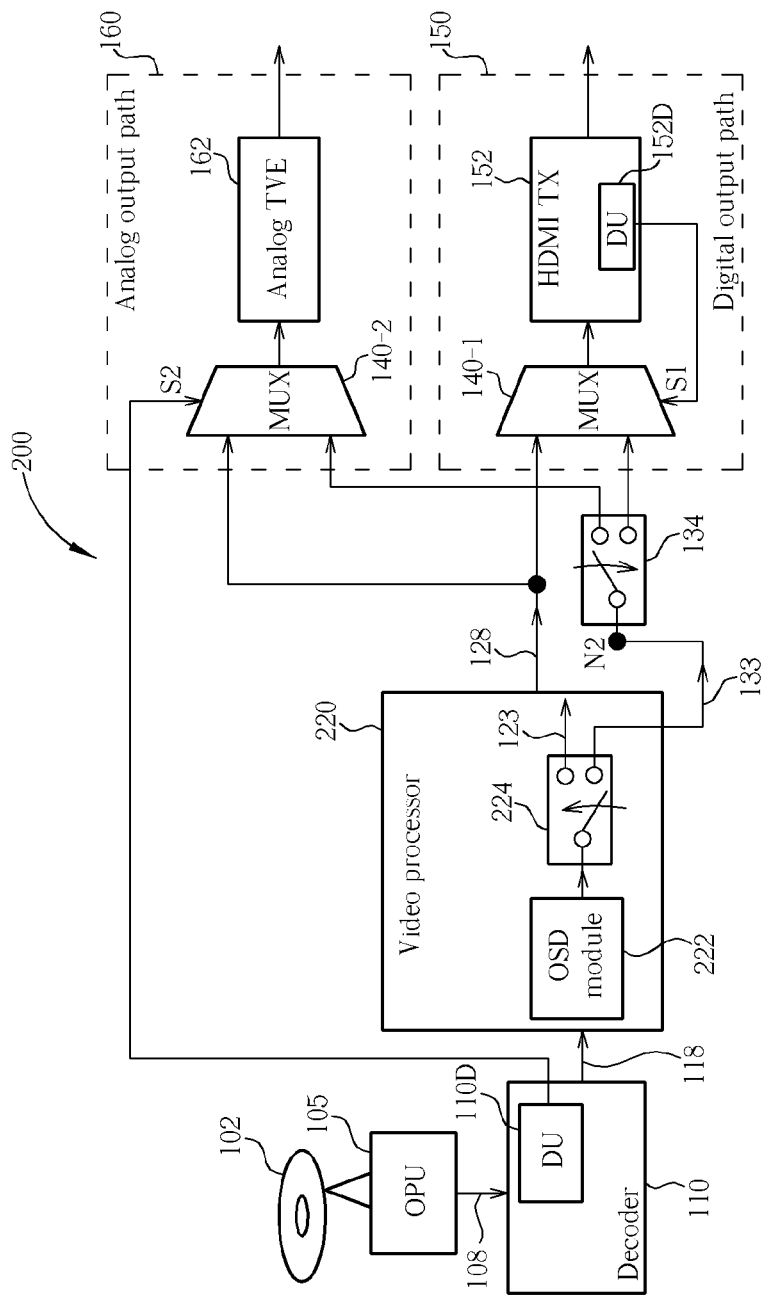
FIG. 2 is a diagram of a video apparatus according to one embodiment of the present invention.

Please refer to FIG. 2. FIG. 2 is a diagram of a video apparatus 200 according to a second embodiment of the present invention, where the second embodiment is a variation of the first embodiment. The differences between the second embodiment and the first embodiment can be described as follows. Implementing with two OSD modules such as the OSD modules 122 and 132 mentioned above is not required here. As shown in FIG. 2, the video processor 120 mentioned above is replaced with another video processor 220 comprising an OSD module 222 and a switch 224, and the OSD data input node N2 can be coupled to the OSD module 222 through the switch 224. The OSD module 222 of this embodiment is capable of generating the OSD data 123 and the OSD data 133 mentioned above, so the video processor 220 may mix the OSD data 123 into the normal video data 128 when needed, and the OSD data input node N2 can be utilized for inputting the OSD data 133 generated by the OSD module 222 when needed with the OSD data input node N2 coupled to the OSD module 222 (through the switch 224).

Figure 3:
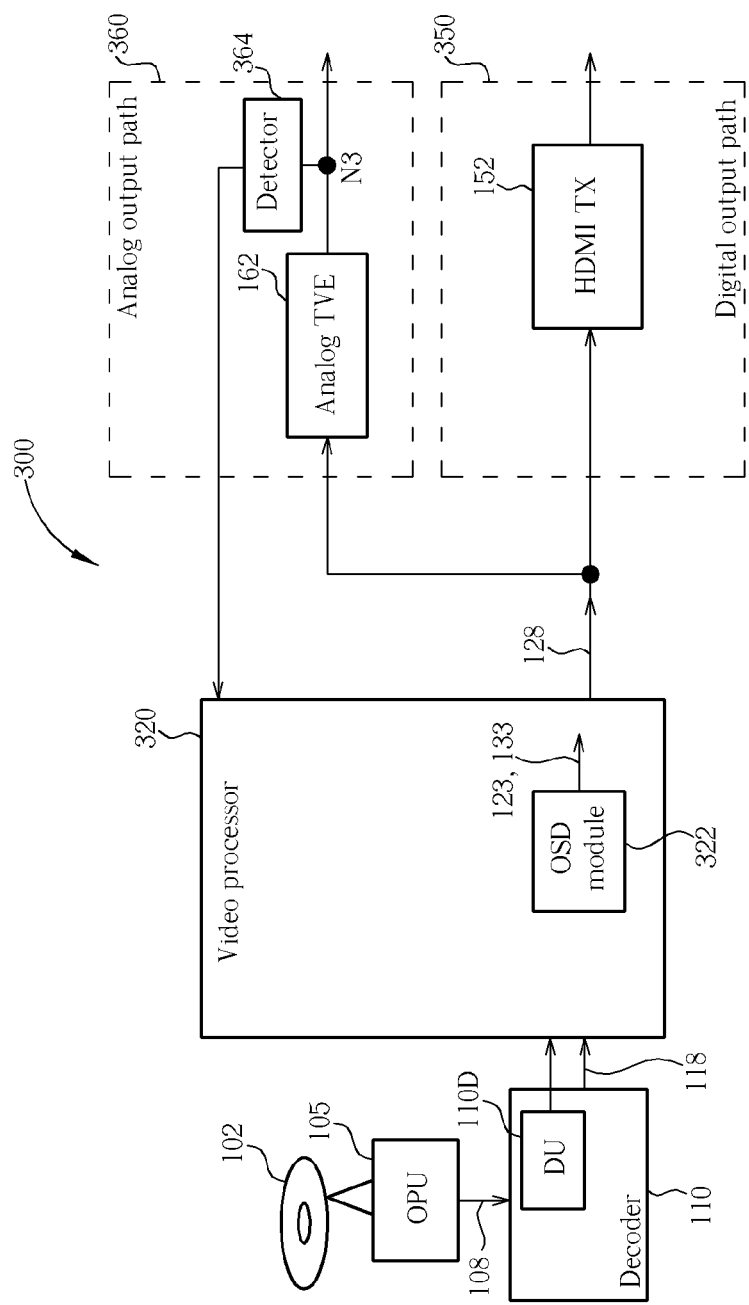
FIG. 3 is a diagram of a video apparatus according to one embodiment of the present invention.

Please refer to FIG. 3. FIG. 3 is a diagram of a video apparatus 300 according to a third embodiment of the present invention, where the third embodiment is a variation of the first embodiment. The differences between the third embodiment and the first embodiment can be described as follows. The digital output path 350 of this embodiment comprises the digital transmitter mentioned above (i.e. the HDMI TX 152 in this embodiment), and the analog output path 360 of this embodiment comprises the analog TVE 162 (which comprises the DAC as mentioned in the first embodiment) and a detector 364, where implementing the output paths with the multiplexers 140-1 and 140-2 mentioned above is not required here. In addition, implementing the video apparatus 300 with two OSD modules such as the OSD modules 122 and 132 mentioned above is not required here. Additionally, a warning message such as "HDCP authentication fail" will not be outputted in this embodiment.

As shown in FIG. 3, the video processor 120 mentioned above is replaced with another video processor 320 comprising an OSD module 322 that is capable of generating the OSD data 123 and the OSD data 133 mentioned above, where the video processor 320 may mix the OSD data 123 or the OSD data 133 into the normal video data 128 when needed. In addition, the detector 364 is capable of detecting whether an external device such as a display device is coupled to an output node N3 of the DAC within the analog TVE 162. When a coupling status of the output node N3 of the DAC of the analog TVE 162 (i.e. the output node of the analog TVE 162 in this embodiment) is detected by the detector 364, the video processor 320 is capable of mixing the OSD data 133 into the normal video data 128. More particularly, when the DU 110D determines that the decoded data 118 corresponds to DOT and notifies the video processor 320 correspondingly, if the detector 364 detects that the display device is coupled to the output node N3 of the analog TVE 162, the video processor 320 will mix the OSD data 133 into the normal video data 128, so the user will be notified by a warning message such as "Digital Only Token" displayed on the display device.

In a variation of the third embodiment, the detector 364 coupled to the output node N3 as shown in FIG. 3 is replaced with another detector positioned near the output node N3 of the DAC of the analog TVE 162. The detector of this variation is capable of mechanically detecting whether an external device is coupled to the output node N3 of the DAC of the analog TVE 162 by detecting the insertion of a connector of a cable for coupling the external device to the output node N3.

In contrast to the related art, the OSD data (e.g. the warning message) is obvious to the user since after coupling a display device to the video apparatus of the present invention, the user is typically looking at the display device and expecting the display device to display something. In addition, the OSD data can carry more information than the flashing LED mentioned above.

It is another advantage of the present invention that the OSD data (e.g. the warning message) is not mixed into the normal video data (which represents the normal video output) according to some embodiments of the present invention. As a result, the OSD data in one output path will not affect another output path (more particularly in some embodiments, the other output path).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video apparatus comprising:
   a video processor for performing video processing to generate normal video data, the video processor comprising:
   a first on-screen display (OSD) module for selectively generating first OSD data that is capable of being mixed into the normal video data;
   an OSD data input node for inputting second OSD data generated by the video apparatus;
   a digital output path comprising:
   a digital transmitter, coupled to the video processor or the OSD data input node, for outputting the normal video data or the second OSD data; and
   an analog output path comprising:
   a digital-to-analog converter (DAC), coupled to the video processor or the OSD data input node, for outputting the normal video data or the second OSD data in an analog format;
   wherein when one output path of the digital and analog output paths outputs the second OSD data, the other output path of the digital and analog output paths outputs the normal video data.

2. The video apparatus of claim 1, wherein the second OSD data represents a warning message or an interactive help dialogue, and the normal video data outputted by the other path represents a normal video output.

3. The video apparatus of claim 2, wherein the digital output path outputs the warning message or the interactive help dialogue if a High-bandwidth Digital Content Protection (HDCP) authentication fail occurs.

4. The video apparatus of claim 2, wherein the video processor performs video processing on decoded data to generate the normal video data, and the analog output path outputs the warning message or the interactive help dialogue if the decoded data corresponds to Digital Only Token (DOT).

5. The video apparatus of claim 1, wherein the OSD data input node is coupled to the first OSD module to input the second OSD data generated by the first OSD module.

6. The video apparatus of claim 1, further comprising:
   a decoder for decoding encoded data to generate decoded data;
   wherein the video processor performs video processing on the decoded data to generate the normal video data.

7. The video apparatus of claim 6, wherein the video apparatus is an optical disc player, and the encoded data is read from an optical disc accessed by the optical disc player.

8. The video apparatus of claim 6, wherein the digital output path further comprises a first multiplexer for coupling the digital transmitter to the video processor or the OSD data input node to select the normal video data or the second OSD data, the analog output path further comprises a second multiplexer for coupling the DAC to the video processor or the OSD data input node to select the normal video data or the second OSD data, the digital transmitter comprises a first determining unit for controlling the selection of the first multiplexer, and the decoder comprises a second determining unit for controlling the selection of the second multiplexer.

9. The video apparatus of claim 1, wherein the digital output path further comprises a first multiplexer for coupling the digital transmitter to the video processor or the OSD data input node to select the normal video data or the second OSD data respectively, and the analog output path further comprises a second multiplexer for coupling the DAC to the video processor or the OSD data input node to select the normal video data or the second OSD data respectively.

10. The video apparatus of claim 9, further comprising:
    at least one determining unit for controlling the selection of the multiplexers.

11. A video apparatus comprising:
    a video processor for performing video processing to generate normal video data, the video processor comprising:
    a first on-screen display (OSD) module for selectively generating first OSD data that is capable of being mixed into the normal video data;
    an OSD data input node for inputting second OSD data generated by the video apparatus;
    a digital output path comprising a digital transmitter capable of outputting the normal video data or the second OSD data, wherein the digital transmitter outputs the second OSD data when coupled to the OSD data input node; and
    an analog output path comprising a digital-to-analog converter (DAC) capable of outputting the normal video data or the second OSD data in an analog format, wherein the DAC outputs the second OSD data when coupled to the OSD data input node;
    wherein when one output path of the digital and analog output paths outputs the second OSD data, the other output path of the digital and analog output paths outputs the normal video data.

12. The video apparatus of claim 11, further comprising:
a decoder for decoding encoded data to generate decoded data;
wherein the video processor performs video processing on the decoded data to generate the normal video data.

13. The video apparatus of claim 12, wherein the video apparatus is an optical disc player, and the encoded data is read from an optical disc accessed by the optical disc player.

* * * * *